United States Patent
Brown

(10) Patent No.: US 12,188,807 B2
(45) Date of Patent: *Jan. 7, 2025

(54) ULTRASONIC METER EMPLOYING TWO OR MORE DISSIMILAR CHORDAL MULTIPATH INTEGRATION METHODS IN ONE BODY

(71) Applicant: Sensia LLC, Houston, TX (US)

(72) Inventor: Gregor J. Brown, Prestwick (GB)

(73) Assignee: SENSIA LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/072,325

(22) Filed: Nov. 30, 2022

(65) Prior Publication Data

US 2023/0086744 A1 Mar. 23, 2023

Related U.S. Application Data

(63) Continuation of application No. 16/550,869, filed on Aug. 26, 2019, now Pat. No. 11,549,841, which is a continuation of application No. 14/980,007, filed on Dec. 28, 2015, now Pat. No. 10,393,568.

(51) Int. Cl.
  *G01F 25/10* (2022.01)
  *G01F 1/667* (2022.01)

(52) U.S. Cl.
  CPC .............. *G01F 25/10* (2022.01); *G01F 1/667* (2013.01)

(58) Field of Classification Search
  None
  See application file for complete search history.

(56) References Cited

U.S. PATENT DOCUMENTS

| | | | |
|---|---|---|---|
| 3,940,985 A * | 3/1976 | Wyler | G01F 1/667 |
| | | | 73/861.31 |
| 4,024,760 A | 5/1977 | Estrada, Jr. | |
| 6,732,595 B2 | 5/2004 | Lynnworth | |
| 10,393,568 B2 * | 8/2019 | Brown | G01F 1/667 |
| 11,549,841 B2 * | 1/2023 | Brown | G01F 1/667 |
| 2001/0045134 A1 | 11/2001 | Henry et al. | |

(Continued)

FOREIGN PATENT DOCUMENTS

JP    2004-138541 A    5/2004

OTHER PUBLICATIONS

International Search Report and Written Opinion on PCT Appl. Ser. No. PCT/US2016/068915 dated Apr. 7, 2017 (13 pages).

(Continued)

*Primary Examiner* — Matthew G Marini
(74) *Attorney, Agent, or Firm* — Foley & Lardner LLP

(57) ABSTRACT

A system and method to detect and quantify integration errors in a transit time ultrasonic flow meter uses dissimilar integration methods or schemes employed simultaneously. In a preferred embodiment, a number of chordal paths are arranged in a single meter body such that at least two dissimilar chordal integration schemes can be used to determine the flow rate. At least one of the chordal paths is common to both integration schemes. The total number of chordal paths needed in any chordal measurement plane is less than the sum of the chordal paths used in each of the integration schemes (as is the sum of the planes), thereby reducing hardware requirements.

19 Claims, 10 Drawing Sheets

(56) References Cited

U.S. PATENT DOCUMENTS

2015/0112614 A1   4/2015   Kannan et al.

OTHER PUBLICATIONS

Palacios et al., "Stanford University Unstructured (SU2 ): An Open-source Integrated Computational Environment for Multi-Physics Simulation and Design," Engineering Research Associate, Department of Aeronautics & Astronautics, 2013 (60 pages).

Tang et al.: "Data Integration For Multi-Path Ultrasonic Flowmeter Based On Levenberg-Marquardt Algorithm", let Science, Measurement And Technology, The Institution of Engineering And Technology, Michael Faraday House, Six Hills Way, Stevenage, Herts. SG12AY, UK. vol. 9, No. 8 (12 pages).

Translation of JP2004138541 (Year: 2004).

Weber, "Ultrasonic Beam Propagation in Turbulent Flow," A dissertation submitted to the faculty of the Worcester Polytechnic Institute, 2003 (181 pages).

Zhang et al.: "Effect Of Flow Disturbance On Multi-Path Ultrasonic Flowmeters", 16th International Flow Measurement Conference 2013, Flomeko 2013, Sep. 26, 2013 (pp. 588-596).

\* cited by examiner

*(Prior Art)*

Cross-sectional view

Plan view

Cross-sectional view

Plan view

*(Prior Art)*

ULTRASONIC METER EMPLOYING TWO OR MORE DISSIMILAR CHORDAL MULTIPATH INTEGRATION METHODS IN ONE BODY

CROSS-REFERENCE TO RELATED PATENT APPLICATIONS

This application is a continuation of U.S. patent application Ser. No. 16/550,869 filed Aug. 26, 2019, which is continuation of U.S. patent application Ser. No. 14/980,007 filed Dec. 28, 2015 (U.S. patent Ser. No. 10/393,568), the contents of which are incorporated by reference herein.

BACKGROUND

This invention generally relates to self-checking flow meters based on the principles of ultrasonic transit time measurement. More specifically, the invention relates to a self-checking, transit time ultrasonic flowmeter which uses two or more chordal integration methods within a single meter body.

Because transit time ultrasonic flowmeters are capable of high accuracy performance over a wide range of application conditions, the meters have been adopted in applications ranging from custody transfer of hydrocarbons to measurement of nuclear feed water flows.

To achieve their high accuracy, transit time ultrasonic flowmeters commonly employ multiple pairs of transducers to infer velocity on a number of discrete chordal planes. The velocity measurements can then be combined, along with information on geometry, to produce a measure of volumetric flowrate, $Q$.

For the purpose of this disclosure, a path is an intended route of ultrasound transmission through the fluid between two transducers. A chordal path (or chord) is a path confined to a single chordal plane. A chordal plane is a plane that intersects two points on the boundary of a conduit and extends in a direction that is parallel with the central axis of the conduit.

Because velocity is continuous but can only be sampled on a number of discrete paths though the conduit, the meters can be prone to integration error. Because of this error, the measured flowrate derived from the velocity on multiple paths is not equal to the true flowrate. Even if the individual chordal path velocity measurements made by the meter have no intrinsic errors, identifying or quantifying the integration errors can be quite challenging. One way of identifying the integration error is to compare, using chordal integration methods, flow rate measurement results from different chordal integration methods in a single meter.

Chordal integration methods have been used in transit time ultrasonic flowmeters since the late 1960's. By choosing the path locations and combining the individual velocity measurements linearly according to rules for numerical integration, the result can represent the velocity integrated or averaged over the cross-section, and hence the volumetric flowrate, i.e., $$\bar{v} = \sum_{i=1}^{N} w_i v(h_i)$$

$$Q = \bar{v}A = A\sum_{i=1}^{N} w_i v(h_i)$$

where $Q$ is volumetric flowrate, $\bar{v}$ is average velocity, A is cross-sectional area, $v(h_i)$ is the path velocity at distance $h_i$, and $w_i$ is the factor used to weight the velocity measurement before summation as illustrated in FIG. 1. Chord locations ($h_i$) and weighting factors ($w_i$) based on the rules of Gaussian integration are commonly chosen, based on either Legendre or Jacobi polynomials. Alternative integration schemes such as Chebyshev or Lobatto methods can also be applied.

More recently ultrasonic flow measurement methods have been developed which make use of two independent measurement systems in order to attempt to identify measurement errors. Examples include the combination of a 4-path chordal measurement with a single-path chordal measurement (see e.g. FIG. 3) and the combination of two 4-path chordal measurements (see e.g. FIG. 4). Although these new methods are generally better at detecting measurement errors than their predecessor methods, they are prone to other operating problems and are deficient when it comes to detection of integration errors.

In the case of the first method, the single-path measurement is much more sensitive to velocity profile changes than the 4-path chordal measurement. Therefore, the meter has a tendency to trigger an alarm at a level where the 4-path chordal measurement is still accurate.

The second method is potentially subject to "common mode" errors. Because the two 4-path chordal measurement systems are similar, any error common to both systems can be equal and, therefore, go undetected. To avoid this problem it is desirable to use two or more dissimilar multi-path chordal integration methods and that, in turn, increases overall hardware requirements. For example, to compare a 3-chord integration with a 4-chord integration, the meter body is required to have measurement paths in 7 chordal planes in total.

A need exists for an transit time ultrasonic flow meter that can accurately and reliably detect integration errors, avoids the deficiencies of the prior art methods, and reduces the overall hardware requirements that the use of dissimilar chordal measurement systems presents.

SUMMARY OF THE INVENTION

A system and method for use in a transit time ultrasonic flow meter uses dissimilar integration methods or schemes employed simultaneously in an effort to detect and quantify integration errors. In a preferred embodiment, a number of chordal paths are arranged in a single meter body such that at least two dissimilar chordal integration methods can be used to determine the flow rate. At least one of the chordal paths (and therefore at least one of the chordal planes) is common to both integration methods so that the total number of chordal paths needed is less than the sum of the chordal paths used in each of the integration methods (as is the sum of the planes), thereby reducing hardware requirements.

Multiple paths can be used per chordal measurement plane. By way of a non-limiting example, a 4-chord integration scheme and a 3-chord scheme could be used, each scheme having two paths per chordal measurement plane with the outermost chords shared between the two different schemes. Eight paths are used in the 4-chord scheme and six in the 3-chord scheme. However, rather than 14 paths being used, the sharing results in a total of five chordal measurement planes and ten paths (two paths per plane) in total.

In a preferred embodiment of the method, a non-transitory computer readable medium with computer instructions stored thereon executed by a processor performs a first chordal integration scheme and a second different chordal integration scheme, at least one chordal path being common to the first and second different chordal integration schemes. The one chordal path lies in a discrete chordal measurement plane across a conduit section of a meter body and the total number of chordal paths is less than a sum of the chordal paths used in the first and second different chordal integration schemes.

The method can include the step of selecting the path locations and weighting factors of the first or second chordal integration scheme to correspond with predefined abscissa and weights of a documented numerical integration scheme. Or the method can include the step of selecting the path locations of the first or second chordal integration independent of documented numerical integration schemes with predefined abscissa, and then determining weighting factors to correspond with those selected locations.

The method can further include the step of selecting a location of the at least one chordal path and weighing factors that correspond with an abscissa and weights of at least one of the first and second different chordal integration schemes. Or, the method can include the step of selecting a location of the at least one chordal path location independent of an abscissa of at least one of the first and second different chordal integration schemes and calculating weighing factors accordingly.

Either the first or second different chordal integration schemes can be an odd-numbered integration scheme and the other one an even-numbered integration scheme. Both schemes could also be odd-numbered or even-numbered.

In a preferred embodiment of the system, a meter body houses multiple ultrasonic transducers that form the chordal paths and a non-transitory computer readable medium with computer executable instructions executed by a processor includes a first chordal integration scheme and a second different chordal integration scheme, at least one chordal path being common to the first and second different chordal integration schemes. The chordal measurement plane can contain two or more chordal paths arranged at different angles to a conduit axis such that a chordal velocity measurement in each chordal measurement plane can be made that is substantially independent of non-axial flow.

The first chordal integration scheme and the second different chordal integration scheme can use two subsets of chordal measurement planes each with a summation that uses weighting factors that are dissimilar. One of the chordal integration schemes can be an odd-numbered integration scheme and another of the chordal integration schemes can be an even-numbered integration scheme.

Objectives of the system and method include accurately and reliably detecting integration errors, avoiding the deficiencies of the prior art methods, and reducing the overall hardware requirements that the use of dissimilar chordal measurement systems presents.

ELEMENTS AND NUMBERING USED IN THE DRAWINGS

10 Flow meter system having two or more dissimilar chordal integration methods
20 Signal processing means (computational electronics)
21 Acoustic processing unit ("APU")
25 Central processing control and display unit
27 Microprocessor
29 Input/output with software (non-transitory computer readable medium)
30 Chordal path
40 Flow meter body

DETAILED DESCRIPTION

A system and method for detecting and estimating integration error associated with the use of an ultrasonic flow-rate meter includes two or more dissimilar chordal multipath integration methods employed in a single meter body. The system differs from prior art systems and methods in that it compares two or more sets of overlapping chordal input data to detect and quantify the error. Because dissimilar integration methods are used, the comparison is less prone to production of false alarms. Additionally, the system does not require that the total number of chordal measurement planes be equal to the sum of the number of chordal planes used in each integration. Because the total number of planes can be less than the total number of chordal velocity inputs to the plurality of integration schemes, overall hardware requirements are reduced.

One example of how this is accomplished is to employ one even-numbered and one odd-numbered integration method or scheme of different type where at least one chordal path (and therefore at least one chordal plane) is shared between the two integration schemes. This method reduces the likelihood of a false alarm and reduces hardware requirements by constructing and operating the meter in such a way that two separate integrations are performed using overlapping subsets of chordal measurement data. For example, where a conventional approach would require seven chordal measurement planes in total to compare 3- and 4-chord integration schemes, only five chordal measurement planes in total are required here, with three of five chords being used for a first integration routine and four of five chords being used for a second integration routine. In a similar way, a combination of a 4-chord integration scheme with a 5-chord integration scheme can be achieved using only five chords when all chords are used in the 5-chord scheme and all but one in a dissimilar 4-chord scheme.

Figure 1:
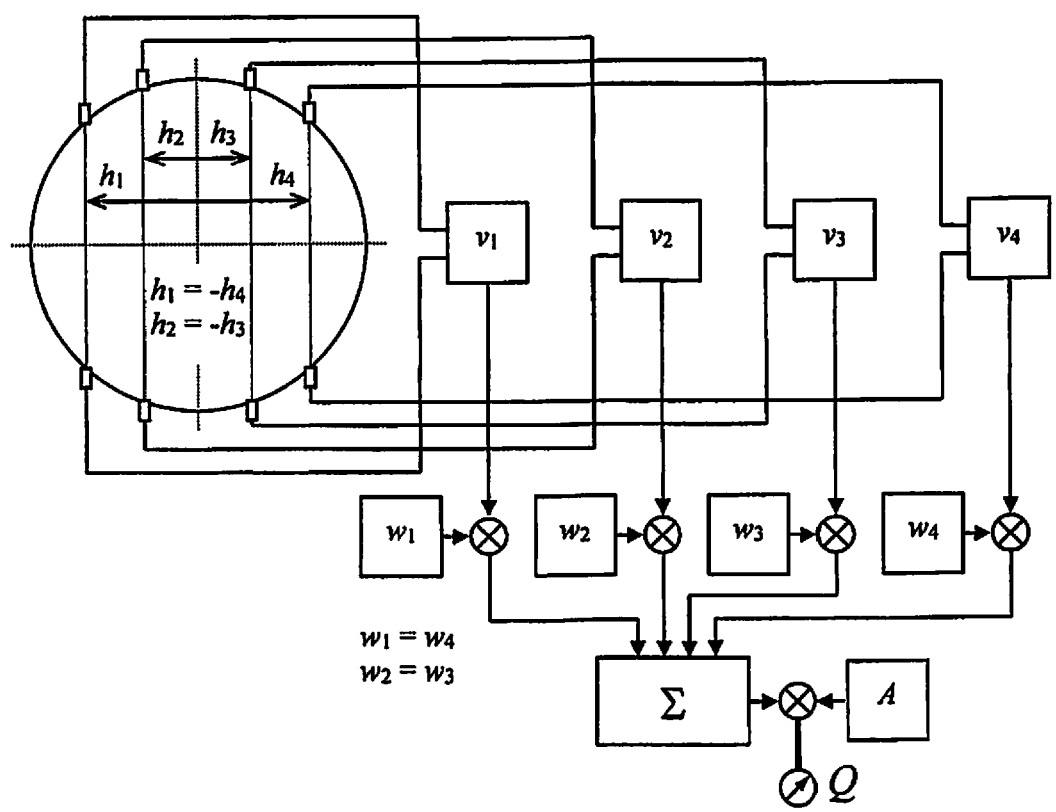
FIG. 1 illustrates a chordal integration method showing chord locations with h spacing as per the integration method. Velocity is measured on each chord, multiplied by weighting factors as per the integration method, and then summed.
Figure 2:
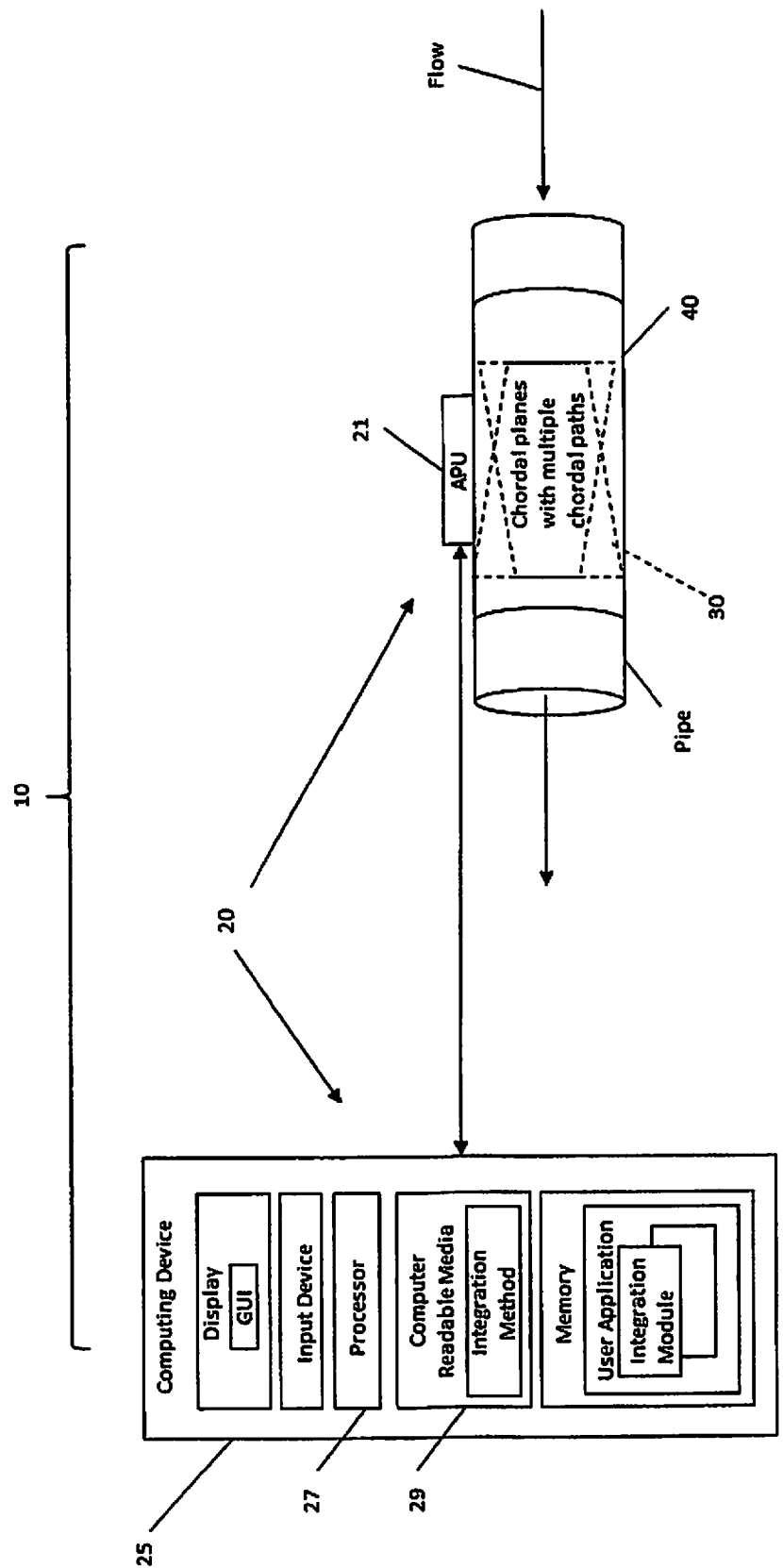
FIG. 2 is a schematic illustrating a preferred embodiment of a system used in connection with the method of FIGS. 7 and 8.
Figure 3:
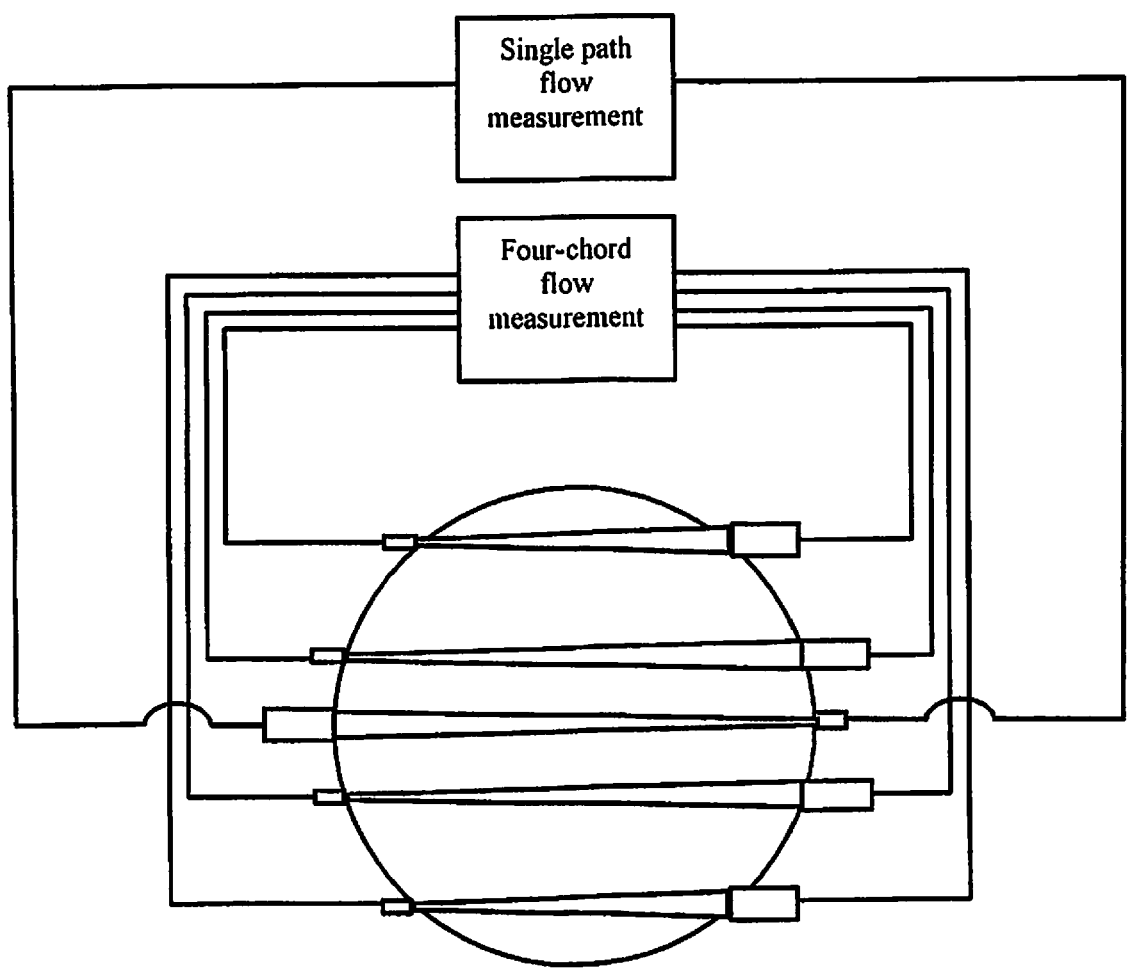
FIG. 3 (prior art) is a schematic illustrating a flow meter with ultrasonic transducers defining multiple chordal paths. There are two independent subsets of paths: one set of four arranged as per a chordal integration flow measurement method and a separate single path flow measurement. Transducer data are transmitted to a computing device having computer readable media with executable instructions of a preferred embodiment of the integration method (see FIG. 1).
Figure 4:
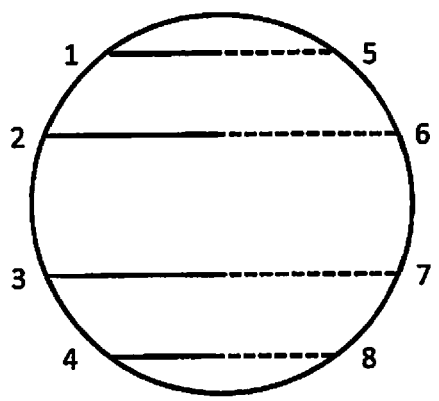
FIG. 4 (prior art) is a schematic illustrating multiple chordal paths used to make two 4-path flow measurements in a single meter body. In this case the chordal integration scheme (spacing and weighting factors) for each 4-path measurement is the same as the other, and each chordal measurement uses an independent subset of paths.
Figure 4:
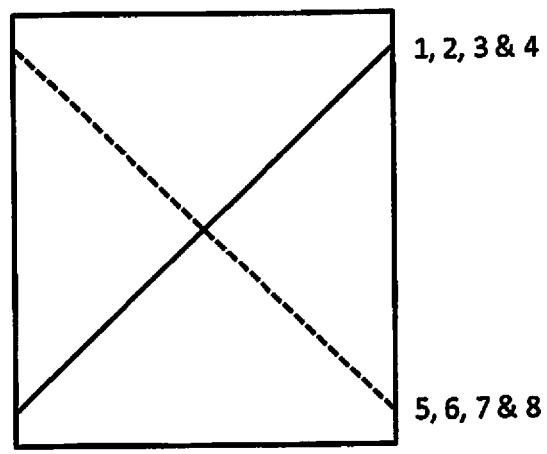
Figure 4:
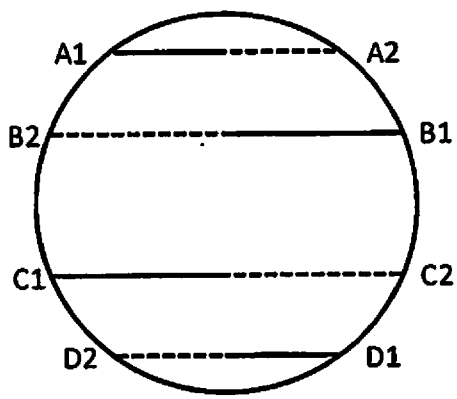
Figure 4:
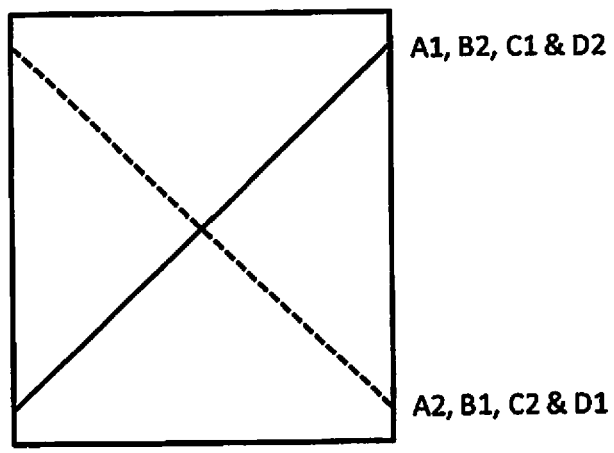

Referring to FIG. 2, the system 10 can be used as part of the signal processing means 20 of an ultrasonic flow meter having two or more chordal measurement planes 30 within the meter body 40. This type of meter typically includes transducers arranged upstream and downstream of one another in pitch-and-catch relationship to send acoustic energy along an acoustic path through the fluid flowing in a conduit (see e.g. FIGS. 3 and 4). The signal processing means 20 determines the transit times for upstream and downstream signal transmission and uses those measured upstream and downstream transit times in combination with other inputs to calculate the velocity in each measurement plane and to infer the flow rate of the fluid.

The signal processing means or computational electronics 20 includes a transmitter or acoustic processing unit ("APU") 21 and a central processing, control and display unit 25 (see FIG. 2). Commonly, the flow meter could have the electronics mounted directly to the meter body, and the functions of the APU 21 and central processing, control and display unit 25 could be separate or combined. The APU 21 controls the transmission and reception of the ultrasonic signals to and from the transducers. The central processing, control and display unit 25, which includes a microprocessor 27 and I/O with software 29 (and memory), typically employs Gaussian integration schemes to process the transit time measurements along the various chordal paths 30 from the APU 21 and calculate flow rate. The central processing, control and display unit 25 can also function as the user interface.

Note there can be two sets of computational electronics attached to the transducers with one or more of the paths and the transducers shared between these electronics with one performing the first integration scheme and another performing the second integration scheme. In this embodiment, communication is required between the two sets of computational electronics so that each set does not use the same transducers at the same time.

Figure 10:
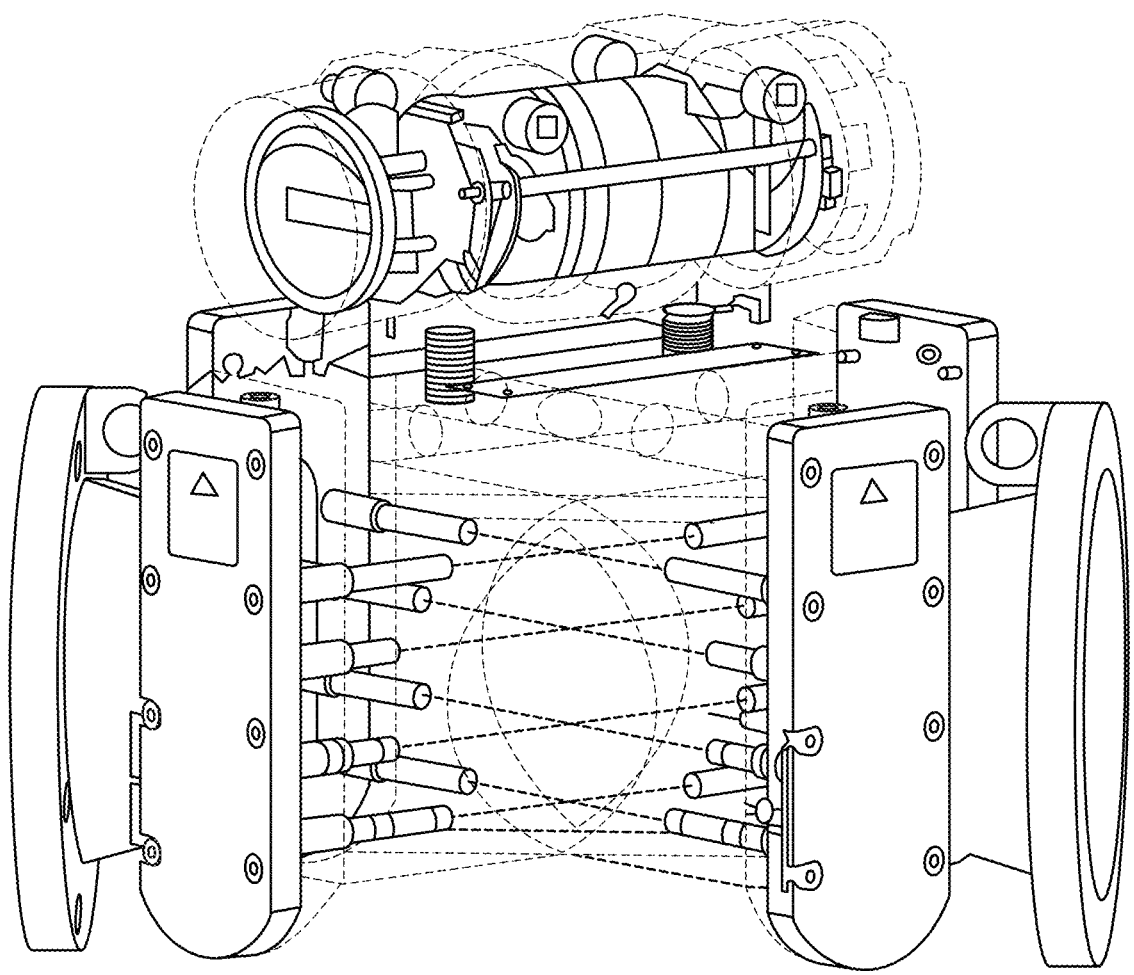
FIG. 10 (prior art) is a non-limiting example of an ultrasonic flow meter that can be adapted to include the two or more dissimilar chordal multipath integration methods in one body. In this example, the meter is an 8-path CALDON™ ultrasonic flow meter (Cameron International Corp., Houston, TX).

A non-limiting example of this type of meter is a CALDON™ ultrasonic flow meter (s). The CALDON™ meter uses a compact transmitter enclosure that can be integrally mounted to the meter body or remote pipe mounted (see FIG. 10). Within the meter body are multiple pairs of fully integrated piezoelectric ultrasonic transducers forming acoustic measurement paths in multiple chordal planes. These paths typically cross the flow stream at an angle of between 45 and 65 degrees so that there is a difference in the transit time of the ultrasonic signals, depending on whether the sound pulse is traveling with or against the direction of flow. The difference in transit times is measured along each path. The meter's electronics infer velocity on each chord and perform an integration of axial velocity to compute an output of volumetric flow rate. In one preferred design, paths are arranged in crossed pairs in each chordal measurement plane. This arrangement of acoustic paths make the axial velocity calculation substantially immune to the effects of non-axial flow and eliminates the need for an upstream flow conditioner. By eliminating the interfering effect of non-axial flow the crossed-pair design enables the integration method to function properly and reducing the requirement for long upstream lengths of straight pipe.

Figure 5:
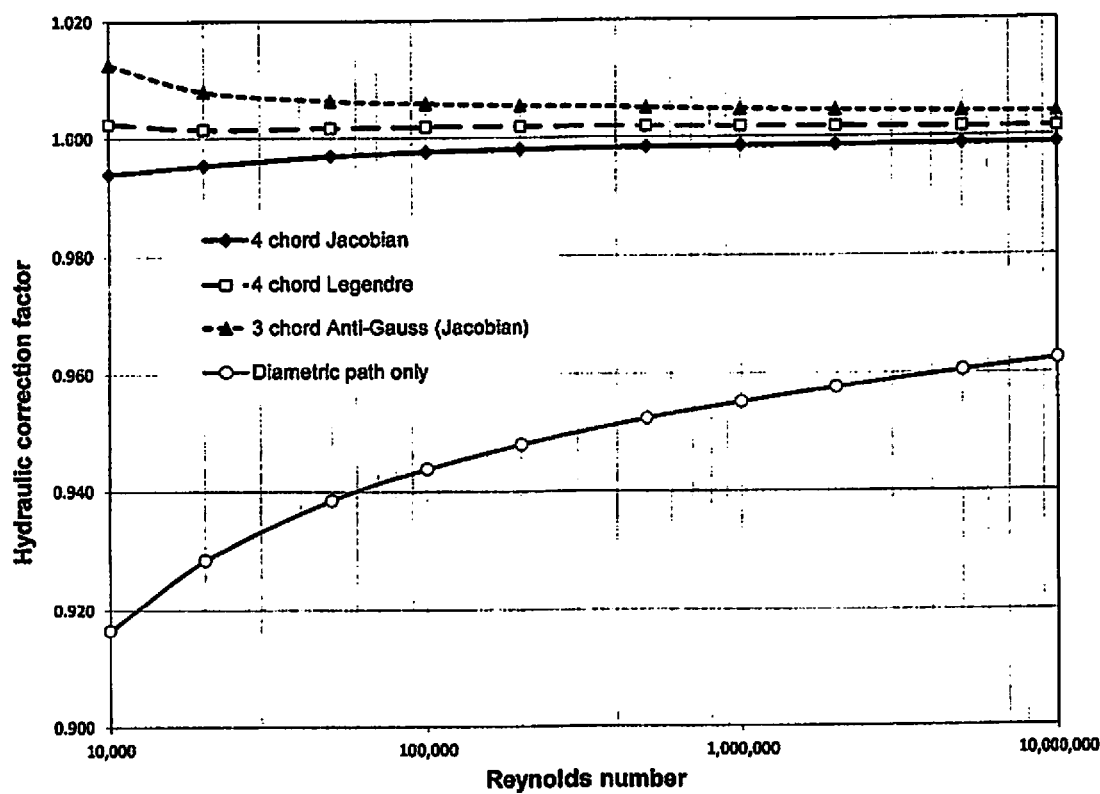
FIG. 5 is a graph hydraulic correction factors from a fully developed (Reichardt) flow profile for various integration schemes.
Figure 6:
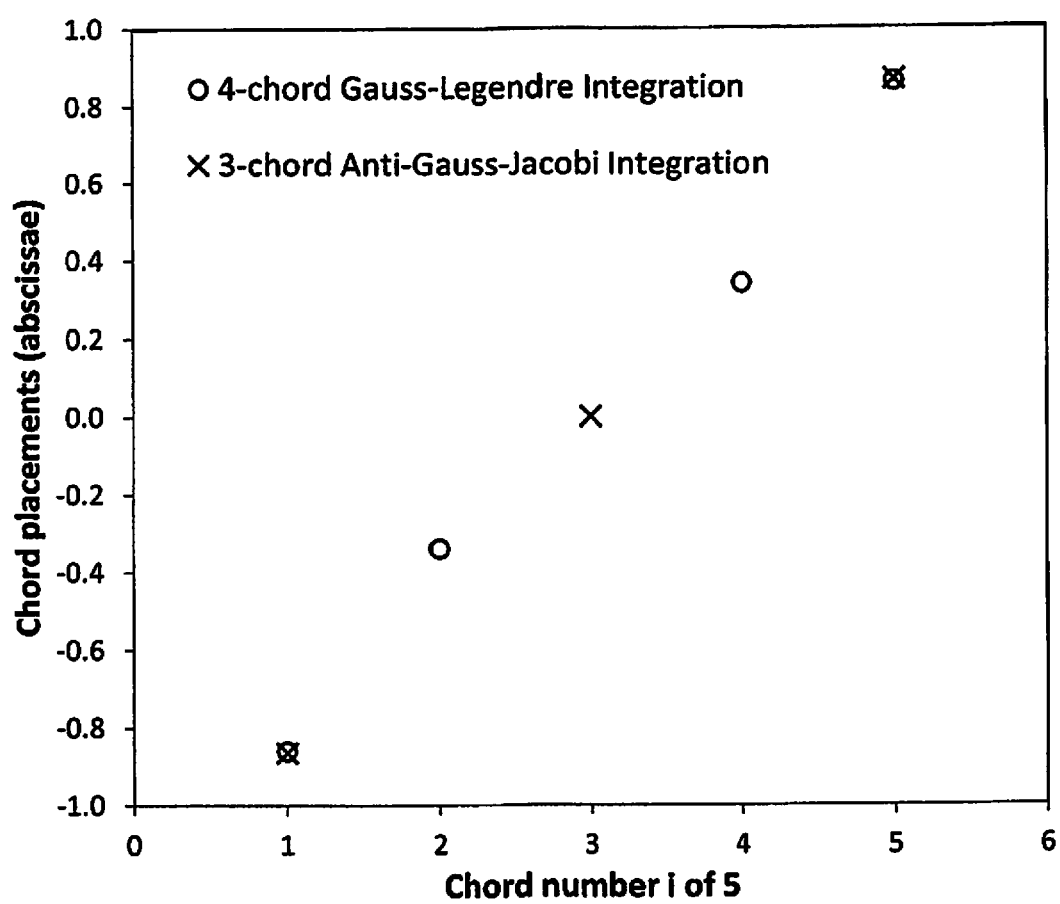
FIG. 6 is a graph of chord spacing (abscissa) for 3-chord Anti-Gauss-Jacobian and 4-chord Gauss-Legendre integration schemes.

Referring now to FIG. 5, integration of the Reichardt profile by well-known methods shows that a 3-chord Anti-Gauss-Jacobian ("Anti-Gauss") integration gives a comparable linearity to that of a 4-chord Jacobian integration. This result shows that the 3-chord Anti-Gauss integration is useful for accurate flow rate measurements. Additionally, the outer chords of the 3-chord Anti-Gauss integration are positioned at almost the same location as the outer chords of a 4-chord Gauss-Legendre integration (see FIG. 6).

Because of this, an arrangement of five chordal measurement planes in total can be used to closely approximate mathematically prescribed integration schemes for both 3- and 4-chord integrations. For example, the 3-chord Anti-Gauss and the 4-chord Legendre can both be realized by adding a single diametric chordal measurement plane to the 4-chord Legendre arrangement.

In this case the chord locations normalized to the pipe diameter for the 4-chord Legendre scheme are −0.861136, −0.339981, 0.339981 and 0.861136. For the 3-chord Anti-Gauss scheme the chord locations are −0.866025, 0 and 0.866025. The five-chord scheme can therefore be realized by placing the two outermost chords at between −0.861136 and −0.866025 and between +0.861136 and +0.866025, e.g. −0.863581 and +0.863581. The corresponding weighting factors for the velocities measured on each plane would then be applied as given in Table 1 below.

TABLE 1

Weighting Factors.

| Chord number | Chord location | Integration method 1 weighting factors (three chord integration) | Integration method 2 weighting factors (four chord integration) |
| --- | --- | --- | --- |
| 1 | −0.863581 | 0.166667 | 0.112580 |
| 2 | −0.339981 |  | 0.390438 |
| 3 | 0 | 0.666667 |  |
| 4 | 0.339981 |  | 0.390438 |
| 5 | 0.863581 | 0.166667 | 0.112580 |

Figure 7:
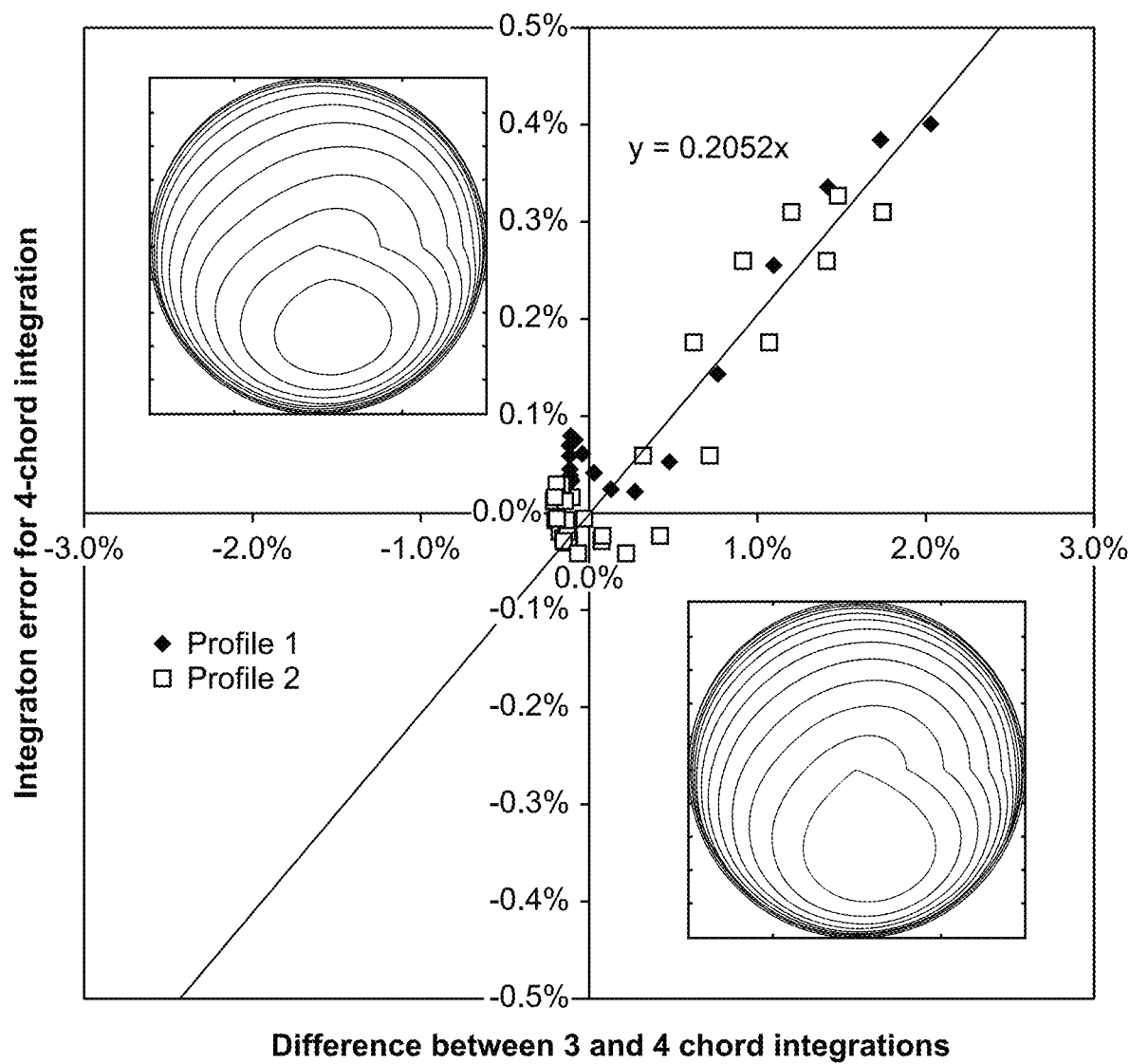
FIG. 7 is a graph of integration error for the 4-chord scheme, plotted versus the difference between the 3- and 4-chord integrations.

FIG. 7 provides an example of how this system can be implemented on the software of the central processing, control and display unit and used as part of the signal processing means of an ultrasonic flow meter. For the two distorted flow profiles shown, the 4-chord integration error (y-axis) is plotted versus the difference between the 3- and 4-chord integrations for various orientations of the profile with rotation of the flow profile in 5 degree steps from 0 to 180 degrees. The integration error in the 4-chord integration is approximately equal to ⅕th of the difference between the 3- and 4-chord integrations, thus allowing the detection and estimation of the integration error as a function of the difference between calculated flowrates.

Figure 8:
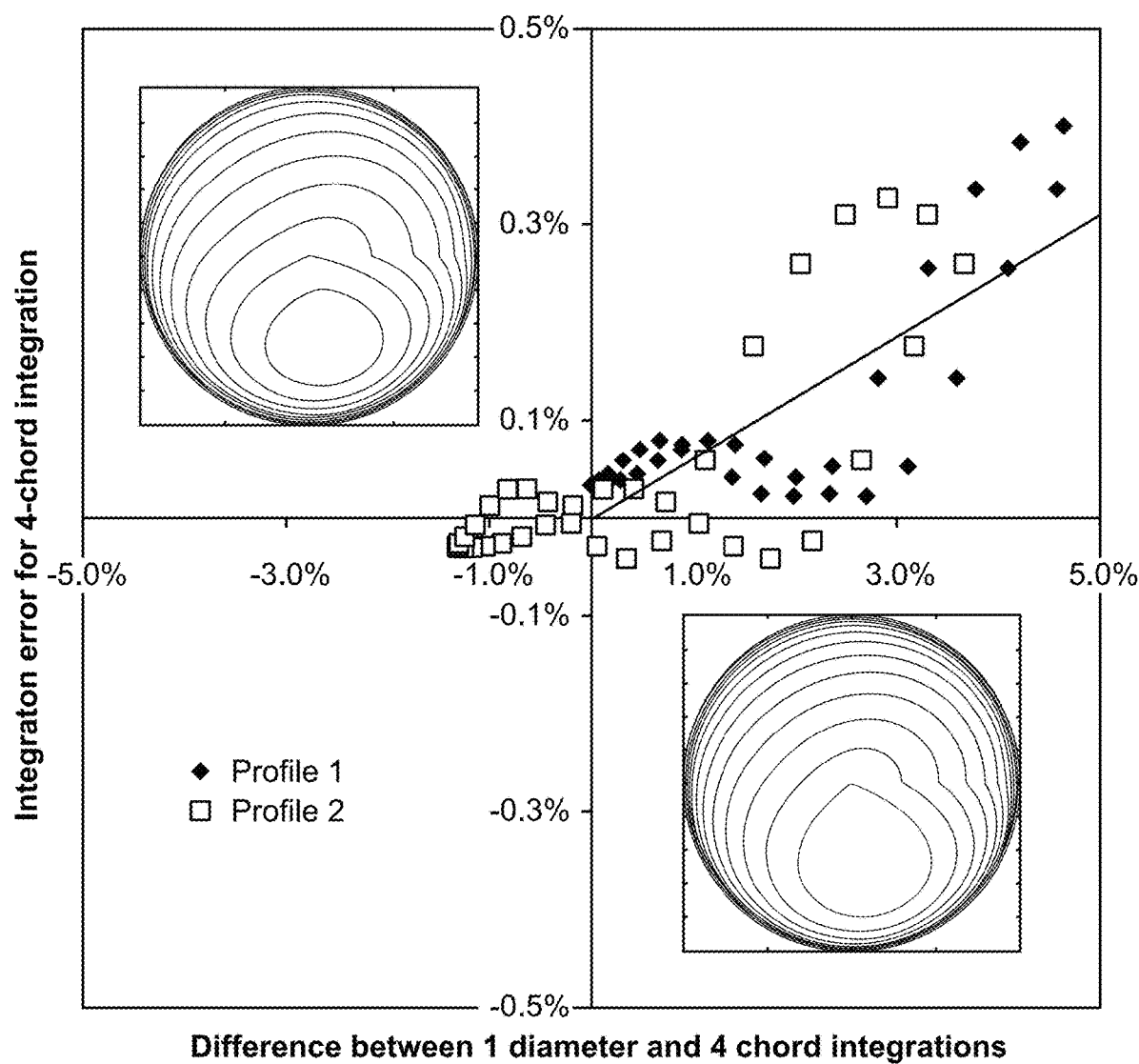
FIG. 8 is a graph of integration error for the 4-chord scheme, plotted versus the difference between a single diameter measurement and the 4-chord integration scheme.
Figure 9:
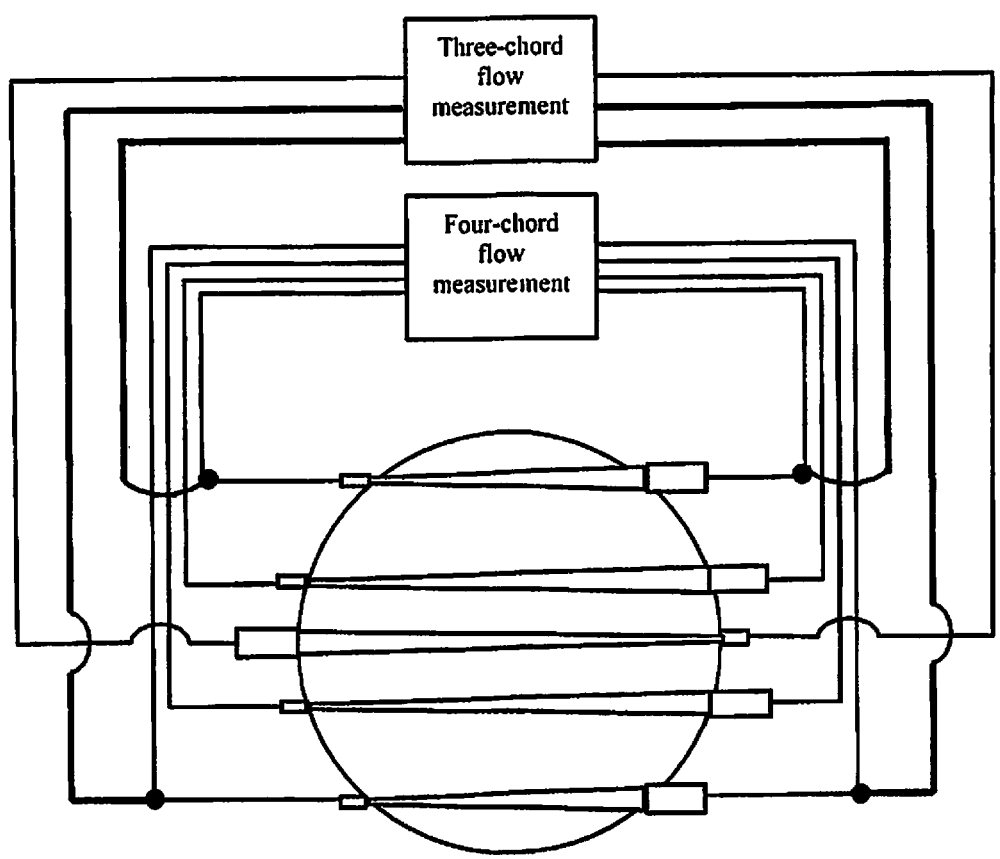
FIG. 9 is a schematic illustrating three- and four-chord measurement schemes in a single body.

FIG. 8 shows a similar plot comparing a single diameter path against the 4-chord configuration for the same two distorted profiles of FIG. 7. There is a much poorer correlation between the difference value and the integration error in the 4-path meter. Therefore, the approach illustrated by FIG. 7 using the three- and four-chord schemes is more effective at detecting and quantifying integration errors than is the approach using a 4-chord and single-path scheme as illustrated by FIG. 8. The example above uses locations for the chordal planes and weighing factors that correspond with the abscissa and weights of an appropriate integration rule. Any two of a variety of integration methods may be used for the first and second integration methods. Gauss-Legendre and Gauss-Jacobi are two well-known integration rules, the Anti-Gauss-Jacobi rule is a less well-known rule. Other integration schemes may be used, such as the Optimal Weighted Integration for Circular Sections ("OWICS") scheme optimized especially for flow measurement purposes.

As an alternative to these rules that have pre-defined abscissa, similar methodologies can be applied where the chord locations (of at least one of the two alternative subsets) are selected arbitrarily or based on other considerations and then the weighing factors are calculated accordingly. In one such possible scheme, four chordal locations could be selected according to the rules of a first integration method with an even number of abscissas, and a fifth chordal plane could be added in the central diametric plane. For the first integration the standard 4-chord weighting factors would be applied and the diametric chord would be ignored, and for the second integration a new set of non-zero weighting factors would be applied to all five chordal velocity inputs.

A preferred embodiment of a method of detecting integration errors—the method being performed by a non-transitory computer readable medium with computer instructions stored thereon executed by a processor—includes the step of: executing a first chordal integration scheme and a second different chordal integration scheme, the chordal integration schemes sharing at least one chordal path in a discrete chordal measurement plane across a conduit section of the meter body. The total number of chordal paths (and planes) is less than a sum of the chordal paths (and planes) used in the first and second different chordal integration schemes. Path locations and weighting factors of one of the first and second different chordal integration schemes can correspond with an abscissa and weights of a numerical integration scheme with pre-determined abscissae. Alternatively, path locations can be selected independent of an abscissa and weights of a numerical integration scheme with pre-determined abscissae, with appropriate weighting factors being calculated for those paths.

One of the chordal integration schemes can be implemented in the form $$\bar{v}_a = \sum_{i=1}^{N} w_{a,i} v(h_{a,i})$$

$$Q_a = \bar{v}_a A = A \sum_{i=1}^{N} w_{a,i} v(h_{a,i})$$

with the other chordal integration schemes implemented in the form $$\bar{v}_b = \sum_{j=1}^{M} w_{b,j} v(h_{b,j})$$

$$Q_b = \bar{v}_b A = A \sum_{j=1}^{M} w_{b,j} v(h_{b,j})$$

wherein the total number of chordal measurement planes P is less than the sum of N plus M such that at least one of the chordal measurement planes at location $h_{a,i}$ is the same as one of the chordal measurement planes at locations $h_{b,j}$.

The preferred embodiments described here are for illustrative purposes. The scope of the invention is defined by the following claims and includes the full range of equivalents to the elements recited.

What is claimed is:

1. A method of detecting one or more integration errors, the method being performed by at least one set of computational electronics including a non-transitory computer readable medium with computer instructions stored thereon executed by a processor, the method comprising steps of:
receiving ultrasonic signals from transducers in a meter body of a flow meter associated with a conduit, the ultrasonic signals traveling along a plurality of chordal paths across the conduit wherein at least one of the plurality of chordal paths lies in a discrete chordal measurement plane across the conduit and determining a velocity on each chordal path in the flow meter;
executing a first chordal integration scheme in the flow meter using at least one of the plurality of chordal paths and a second different chordal integration scheme in the flow meter using the at least one of the plurality of chordal paths, the first chordal integration scheme being an even numbered chordal integration scheme and the second different chordal integration scheme being an odd numbered integration scheme, wherein at least one of the first chordal integration scheme and the second chordal different integration scheme are used with the velocity on each chordal path;
applying first weighting factors to the first chordal integration scheme, wherein the first weighting factors ignore a diametric chordal path used by the first chordal integration scheme;
applying second non-zero weighting factors to the second different chordal integration scheme, wherein the second non-zero weighting factors are applied to all chordal paths used by the second different chordal integration scheme;
detecting in the flow meter the one or more integration errors based on the first chordal integration scheme and the second different chordal integration scheme.

2. The method according to claim 1 further comprising selecting path locations and weighting factors of one of the first and second different chordal integration schemes to correspond with abscissae and weights of a numerical integration scheme with pre-determined abscissae.

3. The method according to claim 1 further comprising selecting path locations of one of the first and second different chordal integration schemes independent of abscissae and weights of a numerical integration scheme with pre-determined abscissae, and then calculating appropriate weighting factors for those paths.

4. The method according to claim 1 whereby one of the chordal integration schemes is implemented in a form of:

$$\bar{v}_a = \sum_{i=1}^{N} w_{a,i} v(h_{a,i})$$

and another of the chordal integration schemes is implemented in a form of:

$$\bar{v}_b = \sum_{j=1}^{M} w_{b,j} v(h_{b,j})$$

wherein a total number of chordal measurement planes is less than a sum of N plus M such that at least one of the chordal measurement planes at location $h_{a,i}$ is the same as one of the chordal measurement planes at locations $h_{b,j}$.

5. The method of claim 1, wherein the first chordal integration scheme uses four chordal paths.

6. The method of claim 1, wherein the second different chordal integration scheme uses five chordal paths.

7. A system for measuring a flow rate of a fluid, the system comprising:
   a meter body of a flow meter comprising multiple ultrasonic transducers, each ultrasonic transducer being used in conjunction with at least one other ultrasonic transducer to form chordal paths in across a conduit section of the meter body; and
   a processor configured to use a first chordal integration scheme using ultrasonic signals across at least one first chordal path of the chordal paths and a second different chordal integration scheme using the ultrasonic signals across at least one second chordal path of the chordal paths to detect integration error, wherein at least one third chordal path of the chordal paths is common to the first and second different chordal integration schemes, the first chordal integration scheme being an even numbered chordal integration scheme and the second different chordal integration scheme being an odd numbered integration scheme, wherein at least one of the first chordal integration scheme and the second chordal integration scheme are used with a velocity on each chordal path, the ultrasonic signals traveling a plurality of chordal paths across the conduit section, wherein at least one of the plurality of chordal paths lies in a discrete chordal measurement plane across the conduit section and determining a velocity on each chordal path in the flow meter;
   wherein the processor is configured to apply first weighting factors to the first chordal integration scheme, wherein the first weighting factors ignore a diametric chordal path used by the first chordal integration scheme;
   wherein the processor is configured to apply second non-zero weighting factors to the second chordal integration scheme, wherein the second non-zero weighting factors are applied to all chordal paths used by the second chordal integration scheme.

8. The system according to claim 7 further comprising the first chordal integration scheme and the second different chordal integration scheme using two subsets of chordal measurement planes each with a summation that uses weighting factors that are dissimilar.

9. The system according to claim 7 wherein a chordal measurement plane contains two or more chordal paths arranged at different angles to a conduit axis such that a chordal velocity measurement in each chordal measurement plane can be made substantially independent of a non-axial flow velocity.

10. The system of claim 7, wherein the first chordal integration scheme has four paths and the second chordal integration has five paths and two paths are shared.

11. An ultrasonic flow meter comprising:
   a meter body comprising multiple ultrasonic transducers, each ultrasonic transducer being used in conjunction with at least one other ultrasonic transducer to form chordal paths across a conduit section of the meter body;
   a processor configured to:
      receive a first set of data based on a first chordal integration scheme using first ultrasonic signals across at least one first chordal path of the chordal paths, the first chordal integration scheme comprising:
      analyzing velocity measurements of a fluid within the conduit section of the meter body, the velocity measurements received from a first number of chordal paths located in a first number of chordal planes;
      receive a second set of data based on a second chordal integration scheme using second ultrasonic signals across at least one second chordal path of the chordal paths, the second chordal integration scheme configured to comprising:
      analyzing the velocity measurements of the fluid within the conduit section of the meter body, the velocity measurements received from a second number of chordal paths, wherein at least one third chordal path of the chordal paths is shared between the first number of chordal paths and the second number of chordal paths, the first number of chordal paths being different than the second number of chordal paths; and
      determine an integration error or integration errors based on the first set of data and the second set of data;
   wherein the first chordal integration scheme is an even numbered chordal integration scheme and the second different chordal integration scheme being an odd numbered integration scheme,
   wherein the processor is configured to apply first weighting factors to the first chordal integration scheme, wherein the first weighting factors ignore a diametric chordal path used by the first chordal integration scheme;
   wherein the processor is configured to apply second non-zero weighting factors to the second chordal integration scheme, wherein the second non-zero weighting factors are applied to all chordal paths used by the second chordal integration scheme.

12. The flow meter of claim 11, wherein:
   the first chordal integration scheme and second chordal integration scheme are dissimilar chordal multi-path integration methods such that the processor compares overlapping chordal input data to detect the integration error, wherein the overlapping chordal input data comprises the first set of data and the second set of data; and
   a total number of chordal planes is less than the total number of chordal inputs provided to the first chordal integration scheme and second chordal integration scheme.

13. The flow meter of claim 11, wherein the first chordal integration scheme further comprising:
   calculating a velocity of the fluid based on a summation of the velocity of the fluid based on one or more ultrasonic measurements received at particular locations within the first number of chordal planes and one or more weighting factors, wherein the calculated velocity is calculated via a summation:

$$\bar{v}_a = \sum_{i=1}^{N} w_{a,i} v(h_{a,i})$$

wherein $\bar{v}_a$ is average velocity, $w_{a,i}$ is a weighting factor for the first chordal integration, and $v(h_{a,i})$ is the velocity at location $h_{a,i}$; and determining a volumetric flow rate based on the calculated velocity and an area of the conduit section.

14. The flow meter of claim 11, wherein the second chordal integration scheme further comprises:

calculating a velocity of the fluid based on a summation of the velocity of the fluid based on one or more ultrasonic measurements received at particular locations within the first number of chordal planes and one or more weighting factors, wherein the calculated velocity is calculated via a summation:

$$\bar{v}_b = \sum_{j=1}^{M} w_{b,j} v(h_{b,j})$$

wherein $\bar{v}_b$ is average velocity, $w_{b,j}$ is a weighting factor for the second chordal integration scheme, and $v(h_{b,j})$ is the velocity at location $v(h_{b,j})$; and determining a volumetric flow rate based on the calculated velocity and an area of the conduit section.

15. The flow meter of claim 11, wherein the processor is further configured to:

select locations of at least one of the chordal paths of the first number of chordal paths or second number of chordal paths based on a predefined abscissa and weights of a first documented numerical integration scheme, wherein the first documented numerical integration scheme comprises at least one of the first chordal integration scheme or second chordal integration scheme.

16. The flow meter of claim 11, wherein the processor is further configured to:

select locations of at least one of the chordal paths of the first number of chordal paths or second number of chordal paths based on based weights of a second documented numerical integration scheme with predetermined abscissae; and calculate an appropriate weighting factor for the at least of the chordal paths.

17. The flow meter of claim 11, wherein:

one of the first chordal integration scheme or second chordal integration scheme is an odd-numbered integration scheme; and one of the first chordal integration scheme or second chordal integration scheme that is not an odd-numbered integration scheme is an even-numbered scheme.

18. The flow meter of claim 11, wherein the first chordal integration scheme has four paths and the second chordal integration scheme has five paths.

19. The flow meter of claim 11, wherein the first chordal integration scheme has four chordal paths.

* * * * *